(12) United States Patent
Pop

(10) Patent No.: US 11,373,461 B2
(45) Date of Patent: Jun. 28, 2022

(54) METHOD AND APPARATUS FOR MONITORING OFF-DUTY TIMES OF A DRIVER

(71) Applicant: CONTINENTAL AUTOMOTIVE GmbH, Hannover (DE)

(72) Inventor: Leona Pop, Timisoara (RO)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 452 days.

(21) Appl. No.: 16/287,416

(22) Filed: Feb. 27, 2019

(65) Prior Publication Data
US 2019/0272684 A1 Sep. 5, 2019

(30) Foreign Application Priority Data
Mar. 2, 2018 (EP) ..................................... 18465505

(51) Int. Cl.
*G07C 5/00* (2006.01)
*G07C 5/04* (2006.01)
*G08G 1/00* (2006.01)
*G08G 1/04* (2006.01)
*G06Q 50/30* (2012.01)
(Continued)

(52) U.S. Cl.
CPC ....... *G07C 5/008* (2013.01); *G06Q 10/06311* (2013.01); *G06Q 10/063114* (2013.01); *G06Q 10/0833* (2013.01); *G06Q 50/30* (2013.01); *G07C 5/02* (2013.01); *G07C 5/04* (2013.01); *G08G 1/20* (2013.01); *G07C 5/002* (2013.01); *G07C 5/06* (2013.01)

(58) Field of Classification Search
CPC . G07C 5/008; G07C 5/02; G07C 5/04; G07C 5/002; G07C 5/06; G06Q 10/06311; G06Q 10/063114; G06Q 10/0833; G06Q 50/30; G08G 1/20
See application file for complete search history.

(56) References Cited

U.S. PATENT DOCUMENTS 4,338,512 A 7/1982 Ludwig
5,327,347 A * 7/1994 Hagenbuch ............ G07C 5/008
701/50
(Continued)

FOREIGN PATENT DOCUMENTS

WO WO 2017/132622 8/2017

*Primary Examiner* — Yonel Beaulieu
(74) *Attorney, Agent, or Firm* — Cozen O'Connor

(57) ABSTRACT

A method for monitoring extra off-duty time intervals of a driver includes: obtaining on-duty time intervals and off-duty time intervals of a driver; and scanning the off-duty time intervals to identify extra off-duty time intervals having a length more than a second minimum length and less than a first minimum length, any identified extra off-duty time intervals being subtracted from a predefined threshold. If the threshold is greater than 0, a workshift reset time interval is analyzed and it is determined if the workshift reset time interval includes an extra off-duty time interval, which cannot be used as workshift reset time interval. Subsequently the analyzed extra off-duty time intervals are subtracted from the threshold. If the threshold is greater than 0, the workshift reset time interval is analyzed and, the workshift reset time interval is, at least partly, shifted from today to tomorrow to create extra off-duty time interval today.

10 Claims, 3 Drawing Sheets

(51) Int. Cl.
  *G07C 5/02*   (2006.01)
  *G07C 5/06*   (2006.01)
  *G06Q 10/06*  (2012.01)
  *G06Q 10/08*  (2012.01)

(56) References Cited

U.S. PATENT DOCUMENTS

| | | | | |
|---|---|---|---|---|
| 5,416,706 | A | * | 5/1995 | Hagenbuch ............ G01G 19/08 |
| | | | | 177/136 |
| 5,631,835 | A | * | 5/1997 | Hagenbuch ........... G01S 1/7034 |
| | | | | 701/50 |
| 8,032,277 | B2 | | 10/2011 | Larschan et al. |
| 8,075,484 | B2 | * | 12/2011 | Moore-Ede ............ B60K 28/06 |
| | | | | 600/300 |
| 10,896,401 | B2 | * | 1/2021 | Berdinis .......... G06Q 10/06315 |
| 11,155,263 | B2 | * | 10/2021 | Madrigal ......... G06Q 10/08355 |
| 2010/0061190 | A1 | * | 3/2010 | Nelson ..................... G07C 5/02 |
| | | | | 368/10 |
| 2012/0233081 | A1 | * | 9/2012 | Hishiki .................... G07C 5/10 |
| | | | | 705/317 |
| 2013/0006715 | A1 | | 1/2013 | Warkentin et al. |

\* cited by examiner

METHOD AND APPARATUS FOR MONITORING OFF-DUTY TIMES OF A DRIVER

RELATED APPLICATION

This application claims the priority of European Application No. EP 18465505 filed Mar. 2, 2018, the content of which is hereby incorporated by reference.

BACKGROUND OF THE INVENTION

1. Field of the Invention

The invention relates to a method for monitoring extra off-duty time intervals of a driver, which are required over and above the minimum mandatory consecutive off duty time that resets the workshift, a driver assistance system, a vehicle comprising the driver assistance system, a program element, and a computer-readable medium.

2. Description of the Related Art

In a developed and global economy, the logistics of goods becomes more and more important. A big amount of this logistics and transportation of goods is realized by trucks (or "lorries"). However, these trucks are driven by humans, and to ensure safety on the roads a driver is only allowed to drive a certain time a day without a break, an off-duty time interval or a rest. Therefore, the on-duty and off-duty time intervals of the driver are tracked, such that an enforcement authority is able to monitor the drivers. Driver assistance systems may help the driver to fulfil the requirements, without wasting unnecessary time. In particular, as different countries have different requirements for on-duty and off-duty time intervals and the driver may not be an expert for the regulations of each country he drives in.

SUMMARY OF THE INVENTION

It may therefore be an object of the present invention to monitor the extra off-duty time intervals in an efficient and reliable manner.

This object of the present invention, may be achieved, according to a first aspect of the invention by a method for monitoring extra off-duty time intervals of a driver, which includes the following steps:

obtaining on-duty time intervals and off-duty time intervals of a driver, wherein each off-duty time interval comprises a workshift reset time interval having a first minimum length and/or an extra off-duty time interval having a second minimum length, wherein the first minimum length is greater than the second minimum length;

initializing a required extra off-duty time interval with a predefined value;

scanning the off-duty time intervals to identify the extra off-duty time intervals, which have a length more than the second minimum length and less than the first minimum length;

subtracting the identified extra off-duty time intervals from the required extra off-duty time interval to obtain a first residual required extra off-duty time;

if the first residual required extra off-duty time interval is greater than 0, analyzing the workshift reset time interval and determining if it comprises an extra off-duty time interval, which cannot be used as workshift reset time interval;

subtracting the analyzed extra off-duty time intervals from the first residual required extra off-duty time interval to obtain a second residual required extra duty-off time;

if the second residual required extra off-duty time interval is greater than 0, analyzing the workshift reset time interval and shifting, at least partly, the workshift reset time interval from today to tomorrow to create extra off-duty time interval today;

subtracting the created extra off-duty time interval from the second required extra off-duty time interval to obtain a third residual required extra duty-off time interval;

monitoring, whether the third residual required extra off-duty time interval is greater than 0; and outputting a warning if the third residual required extra off-duty time interval is greater than 0.

Thus, the method provides a way to determine if the driver of a vehicle has fulfilled the requirements for the extra off-duty time intervals implied by the regulator. First, the method may obtain on-duty time intervals (driving, loading, unloading) and off-duty time intervals (sleeping, resting, eating, waiting at the border) of the driver over a period of time, such as a day, a 24 hours period, a week or a month. The off-duty time intervals may comprise extra off-duty time intervals and workshift reset time intervals. The workshift reset time intervals may be longer than the extra off-duty time intervals and have a duration greater than a first minimum length, wherein the extra off-duty time intervals have to be longer than a second minimum length. The regulator may define the duration of the first minimum length and the second minimum length. Further, the method initializes a required extra off-duty time interval with a predefined value, e.g., 2 hours. This required extra off-duty time may act as a threshold, which has to be exceeded. The method then searches for off-duty time intervals in the obtained time intervals (on-duty and off-duty time intervals, wherein the off-duty time intervals are relevant here), which have a duration of more than the second minimum length and less than the first minimum length. These found off-duty time intervals may be considered as extra off-duty time intervals and are subtracted from the required extra off-duty time interval. If the required extra off-duty time interval is still greater than 0, the method analyzes the off-duty time intervals, which have a duration of more than the first minimum length. During the analysis the method determines if these off-duty time intervals comprise off-duty time intervals, which cannot be used as workshift reset, for example waiting time and standby time at an oil or natural gas well site (in case the driver operates under the Oil Well Service Vehicle Permits), but may be considered as an extra off-duty time interval. The identified extra off-duty time intervals may be also subtracted from the required extra off-duty time interval. If the required extra off-duty time interval is still greater than 0, the method shifts the workshift reset time interval inside the off-duty time interval of the workshift reset time interval from today to tomorrow, such that an extra off-duty time interval is created today. In other words, the beginning of the workshift reset time interval is shifted to a later start time to create an extra off-duty time interval between the beginning of the off-duty time interval and the beginning of the workshift reset time interval. It should be noted that this might only be practicable, if the duration of the off-duty time interval of the workshift reset is longer than the first minimum length, e.g., 8 or 10 hours. The created extra off-duty time interval is also subtracted from the required extra off-duty time interval. Furthermore, the method monitors if the required extra off-duty time reaches 0 or less after the last subtraction (it only considers the minimum required time out of an available off-duty time interval, so that the rest which might still remain in addition to the 'used' extra off-duty time interval in this day and the workshift reset time interval may be considered as extra off-duty time interval for the next day). In the case the latter is not, a warning may be outputted to the driver and/or to a fleet manager.

Alternatively or in addition, the extra off-duty time intervals may be summarized and the sum can be compared to the required extra off-duty time interval, wherein the sum has to be greater than the required extra off-duty time interval.

The method according to an aspect of the present invention may be used to ensure that the rules implied by the regulator (e.g., Canadian legislation) regarding the daily off-duty time intervals (extra off-duty time interval and workshift reset time interval) required for commercial vehicle drivers are fulfilled. The driver may be required to take 2 hours of daily extra off-duty time intervals besides the 8 hours consecutive hours of rest that give a workshift reset time interval. The off-duty time intervals may consist of several consecutive duty statuses of type off-duty—the off-duty time intervals of type "off-duty" may be for example: OFF, SB (sleeper berth), waiting at well station (OFFS), sleeping at well site or personal use. Each of the off-duty time intervals or periods may be used (totally or partially) to fulfil the required extra 2 hours of daily extra off-duty time intervals. Further, each of the off-duty time intervals may be longer as 30 minutes. The method according to an aspect of the invention includes scanning the off-duty time intervals of a driver for a complete driver day (24 hour time period, considering driver offset and the drive start of day), starting from the oldest day to be processed until the newest day to be processed.

After the method is applied for one calendar day, a previously "marked" off-duty time interval (used the day before to fulfil the requirements) may also span into the new day to be processed. Thus, the "marked" off-duty time intervals has to be preserved for applying the method for the new day.

The method may receive all the off-duty time intervals and on-duty time intervals of the driver that span over the time frame of the days being processed, e.g., a vector with the information. The off-duty time intervals may completely fill in the day window or it may be only partially included in the required time intervals. The off-duty time intervals, which qualifies for a workshift reset time interval (WR) are previously marked as "FullCore" (a distinctive state in order to identify these intervals out of all the off-duty time intervals). Further, the method may receive the timestamp corresponding to the beginning of the day being processed, this may be a period of 24 hours, which may not necessary correspond with a calendar day. Furthermore, the amount of "extra off-duty time required" may be fed into the method (normally it starts with 2 hours, as required by the regulator).

The method according to an aspect of the invention mainly implies three different subsequent steps. In a first step, the method scans the off-duty time intervals in the obtained on-duty and off-duty time intervals of the driver. In one aspect, the method only looks in the first step at those off-duty time intervals, which do not qualify as a workshift reset time intervals (e.g., their duration is not long enough; those periods are not marked as "FullCore"), but are longer as the second minimum length. The workshift reset has to be longer as a first minimum length (typically 8 hours). The found off-duty time intervals may be used and marked as extra off-duty time intervals. The method subtracts from the "required extra off-duty time interval" the duration of the off-duty time intervals found in step 1, which have a duration longer as the second minimum length (typically of 30 minutes) and a shorter duration than the first minimum length. In the case that after completing step 1 the "required extra off-duty time intervals" is not yet 0, the method continues with step 2. Otherwise, the requirements are fulfilled (the driver had extra off-duty time intervals greater than 2 hours) and the method ends.

In step 2 the method scans the off-duty time intervals and looks at those off-duty times, which qualify as workshift reset time interval or off-duty time intervals marked as "FullCore" (longer than the first minimum length, e.g., 8 hours), but tries to use parts of the interval that cannot be used as "core" workshift reset time interval, but can be used as a part of the extra off-duty time interval (e.g.: in case of well service permit enabled, the time spent waiting at a well site or sleeping at a well site may be considered as extra off-duty time intervals). The found extra off-duty time intervals are subtracted from the residual required extra off-duty time interval (obtained after step 1). If after completing step 2 the required extra off-duty time interval is not yet 0, the method continues with step 3, Otherwise, the method ends.

In step 3, the method scans the off-duty time intervals and looks at those, which qualify as the workshift reset time interval and for each such time interval the method checks if the duration of the time interval is greater than the first minimum length (i.e., 8 hours required by the rule). If so, the method provides to use the extra time interval, which is the difference between the duration of the found off-duty time interval comprising the workshift reset time interval and the first minimum length, as part of the required extra off-duty time interval. In other words, if the time interval in which the workshift reset time interval is located is longer than the first minimum length, the difference between the duration of this time interval and the first minimum length may be used as a part of the extra off-duty time interval. Therefore, the created extra off-duty time interval may be subtracted from the residual required off-duty time interval after step 2 is terminated. In order to do this, the method tries to mark the minimum required duration for a period that gives the workshift reset time interval as "Core" and the extra period is considered as part of the required extra off-duty time interval and is marked as "Used". Thus, the required off-duty time interval reaches 0. The remaining time interval not needed to fulfil the requirements, remains in its default state as "Unused" and it may be used for the next day.

The time intervals marked as "Used" (the extra off-duty time interval) has to be in the time period of the day being processed (period of 24 hours, which does not have to correspond to a calendar day, since it takes into account the driver terminal offset and the 24 h period start time, settings that are defined for each driver by the company), while intervals marked as "Core" intervals (the workshift reset time interval) may span also outside of this time window (e.g.: a "Core" interval may start in day N and end in day N+1). The marking is done in such a way that it uses only the minimum required time (for this it splits a duty status into several chunks and only the chunk needed is marked as "Used"/"Core" the rest remains in the state "Unused" in order to be able to use it for a next day to be processed. The method also ensures using the off-duty time period in the most beneficial way, such that in case of a long off-duty time interval that begins in day N but ends in day N+1, it first marks the "Used" part for day N at the beginning of the off-duty time interval, then marks the "Core" part right after it in order to leave the latest part (that spans in day N+1) as "Unused" so that it can be used as needed for day N+1.

The method presented above may be executed day by day, starting with the oldest day to be processed going to the youngest day. The marking of the off-duty time intervals from day N may be preserved when the off-duty time intervals are scanned/processed for day N+1 and so on.

According to one aspect of the invention, the first minimum length is 8 hours.

According to one aspect of the invention, the second minimum length is 0.5 hours.

According to another aspect of the invention, the required extra off-duty time interval is 2 hours.

Another aspect of the invention relates to a driver assistance system for a vehicle. In this aspect, the driver assistance system comprises a tracking module, a calculation module and an output module. The tracking module is configured to track on-duty time intervals, during which the vehicle is operated, and off-duty time intervals, during which the vehicle is not operated or is operated under personal use. The calculation module is configured to calculate a start time, which indicates to the driver how much off-duty time he still needs to spend and/or a stop time, which indicates to the driver how much on-duty time he has left, wherein the calculated start time and/or stop time depends on duration and times of the on-duty time intervals and the off-duty time intervals that have been tracked in the past. The output module is configured to output the start time and/or stop time to the driver.

The driver assistance system may calculate, based on the obtained or tracked on-duty and off-duty time intervals of the driver, an optimized start time and/or stop time for the driver, wherein the optimized times are in accordance with the official requirements implied by the regulator. The start time may be a time at which the driver is permitted to start a new on-duty time interval (e.g., the driver can start driving) and a stop time may be a time at which the driver has to start a new off-duty time interval to fulfil the requirements (e.g., the driver has to sleep). The on-duty and off-duty time intervals may be tracked by a tracking module and the start time and/or stop time may be output or displayed to the driver via an output module, such as a display or a monitor. For calculating or determining the start time and/or stop time for the driver, the calculation module has to monitor the extra off-duty time intervals and if the requirements in view of off-duty time intervals are fulfilled. Based on the extra off-duty time intervals, the start and/or stop time may be calculated. As an example, if the extra off-duty time interval is not yet fulfilled, the calculation module may calculate a stop time, which is able to still fulfilling the requirements. Thus, the driver has to stop soon to fulfil the requirements. The same holds true for the calculation of the start time, the calculation module may calculate the earliest start time at which the driver may start a new on-duty time interval and at which the requirements are fulfilled.

The previous and hereinafter described method may be implemented on a driver assistance system, which comprises a processor, a non-volatile memory and an output module. The data that needs to be kept persistent may be stored in the non-volatile memory and the output of the method can be displayed to the driver via the output module, e.g., a display. The method may be implemented in a standalone device that is used in a truck (or a lorry), as an application on a mobile device, e.g., a smartphone, or as a computer application for a backend system that monitors the drivers of a fleet.

According to an aspect of the invention, the calculation module is configured to use the preceding and hereinafter described method to calculate the start time and/or the stop time.

According to another aspect of the invention, the calculation module is configured to calculate the start time and/or stop time based on road conditions of the driven route.

The road conditions may be the actual and/or the expected road conditions such as traffic jam, snow, ice, open roads, accidents and limitations of road usage. Thus, it could be more economical to schedule an off-duty time interval now, if at the moment a traffic jam is present and it is expected that the traffic jam may be departed after the off-duty time interval.

According to an aspect of the invention, the calculation module is configured to calculate the start time and/or stop time based on the actual fuel level of the vehicle.

According to an aspect of the invention, the calculation module is configured to calculate the start time and/or stop time based on the availability of parking spaces along the driven route.

Thus, if at the next resting place no parking space will be available it could be more convenient to take the off-duty time interval at the present resting place, as a parking spot is available. The calculation module may consider the available parking space when calculation the start time and/or the stop time for the driver.

According to an aspect of the invention, the output module is configured to warn the driver and/or an operator, if a duration of one of the off-duty time intervals is less than a predefined target time interval.

According to an aspect of the invention, the driver assistance system is a mobile device. Further, the driver assistance system may be an application for a mobile device.

According to a further aspect of the invention, the driver assistance system is a Backend or an application running on a Backend.

The on-duty and off-duty time intervals of the driver may also be transmitted to a backend and the backend is configured to execute the preceding and hereinafter described method for monitoring the extra off-duty time intervals and calculating a start time and/or a stop time. The evaluation result of the backend may be retransmitted to the vehicle and/or the driver of the vehicle. Further, also a fleet manager may be informed if one of the drivers does not fulfil the requirements.

According to another aspect of the invention, a vehicle comprising a driver assistance system for determining the extra off-duty time intervals is provided.

The vehicle may, for example, be a motor vehicle, such as a car, bus or truck, but also may be a ship, a boat, an aircraft or a helicopter.

According to another aspect, there is provided a computer program element controlling apparatus as previously described which, in the computer program element executed by a processing unit, is adapted to perform the method steps as previously described.

There is also provided a non-transitory computer readable medium having stored the computer element as previously described.

Advantageously, the benefits provided by any of the above aspects equally apply to all of the other aspects and vice versa.

The above aspects and examples will become apparent from and be elucidated with reference to the embodiments described hereinafter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments will be described in the following with reference to the following drawings.

DETAILED DESCRIPTION OF THE PRESENTLY PREFERRED EMBODIMENTS

Figure 1:
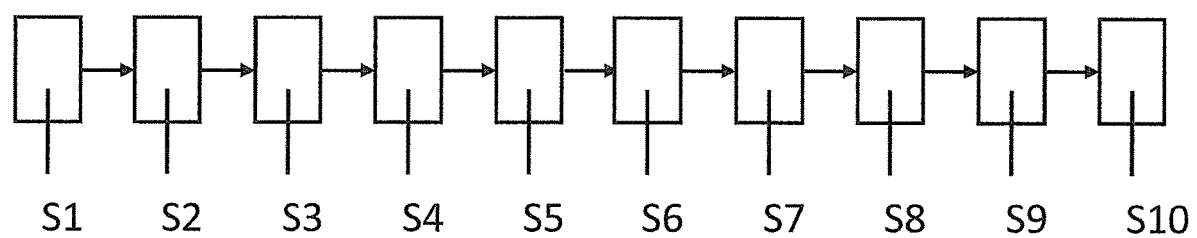
FIG. 1 shows a flow chart of a method for monitoring extra off-duty time intervals for a driver.

FIG. 1 shows a flow diagram of a method for monitoring the extra off-duty time intervals of a driver. In step S1 on-duty time intervals and off-duty time intervals of the driver are obtained, for example by a tracking module. The off-duty time intervals comprise a workshift reset time interval, having a first minimum length, and/or an extra off-duty time interval, having a second minimum length, wherein the first minimum length is greater than the second minimum length. In step S2, a required extra off-duty time interval is initialized with a predefined value, e.g., 2 hours per 24 hours period. In step S3 the extra off-duty time intervals are searched, which have a greater duration as the second minimum length and less than the first minimum length. In step S4, the searched extra off-duty time intervals are subtracted from the required extra off-duty time interval. By doing so, a first residual required extra off-duty time is obtained. In step S5 the workshift reset time interval is analyzed when the first residual required extra off-duty time is greater than 0. During the analysis, it is determined if the workshift reset time interval comprise off-duty time intervals, which cannot be used (according to the requirements) as a workshift reset time interval but may be considered as an extra off-duty time interval. In step S6, the found extra off-duty time interval of step S5 is subtracted from the first residual required off-duty time. By doing so, a second residual required extra off-duty time is obtained. In step S7, the workshift reset time interval is analyzed when the second residual required extra off-duty time is greater than 0. In the analysis, the workshift reset time interval is shifted, at least partly, from today to tomorrow, to create an extra off-duty time interval today. In step S8, the created extra off-duty time is subtracted from the second residual required off-duty time to obtain a third residual required extra off-duty time. In step S9, the third required extra off-duty time is monitored such that it reaches 0. In step S10 a warning is outputted if the third residual required extra off-duty time is greater than 0.

Figure 2:
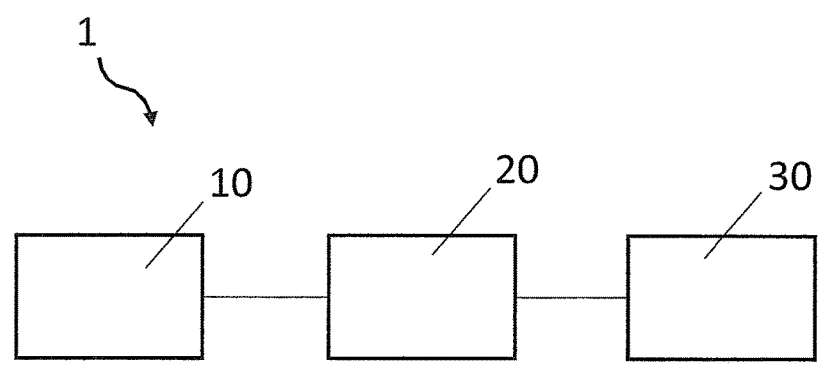
FIG. 2 shows a block diagram of a driver assistance system for a vehicle.

FIG. 2 shows a block diagram of a driver assistance system 1. The driver assistance system 1 comprises a tracking module 10, a calculation module 20 and an output module 30. The tracking module 10 may be configured to track or to obtain on-duty time intervals, during which the vehicle is operated, and off-duty time intervals, during which the vehicle is not operated, of a driver. Alternatively or in addition, the tracking module may be a vector or a datasheet with driving and resting times of a driver. The calculation module 20 may be configured to determine if the driver fulfils the requirements of the regulator in view of the extra off-duty time intervals per day. Further, the calculation module 20 may be a processor-based system configured to calculate, based on the determined extra off-duty time interval, a start time at which the driver is permitted to start a new on-duty time interval and/or a stop time at which the driver has to start a new off-duty time interval. The determination of the extra off-duty time intervals may be done according to the preceding and hereinafter described method for monitoring the extra off-duty time intervals. The output module 30 may be configured as a display to output the calculated start time and/or stop time to the driver and/or to the fleet manager.

Further, the calculation module 20 may be configured to include into the calculation of the start time and/or stop time different further parameters, such as the actual and the expected road conditions of the to be driven route, the actual fuel level of the vehicle or the availability of parking spaces along the to be driven route. Thus, a route may be scheduled in an even more economic, faster or efficient manner, wherein the legal requirements are still completely fulfilled.

Further, the output module 30 may warn the driver about any deviations from the rules implied by the legislation—e.g., if the extra off-duty time interval is not yet fulfilled, such that the driver is informed and may take action.

It should be noted, that the driver assistance system 1 may be a standalone device, a mobile device and/or a backend running an application, which when executed performs the preceding and hereinafter described method.

Figure 3:
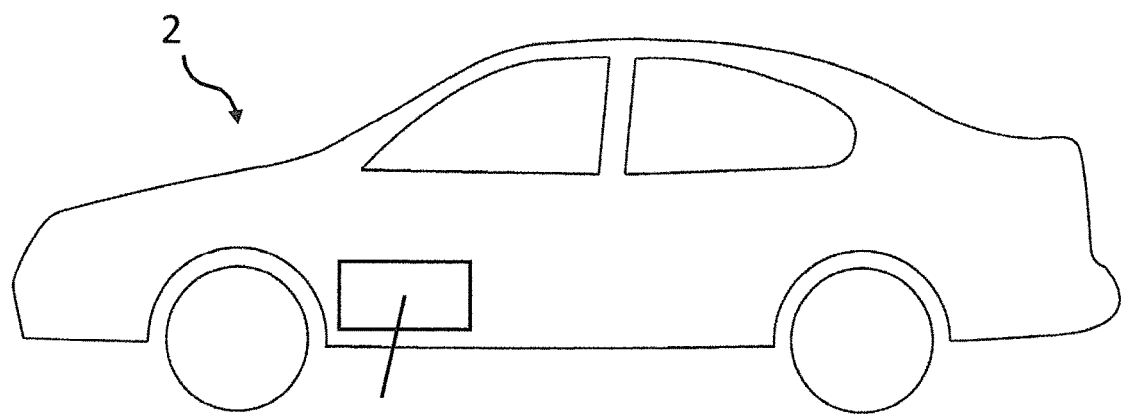
FIG. 3 shows a vehicle comprising the driver assistance system.

FIG. 3 shows a vehicle 2 comprising the driver assistance system 1. The driver assistance system 1 is able to perform the preceding and hereinafter described method to monitor the extra off-duty time intervals of a driver.

Figure 4:
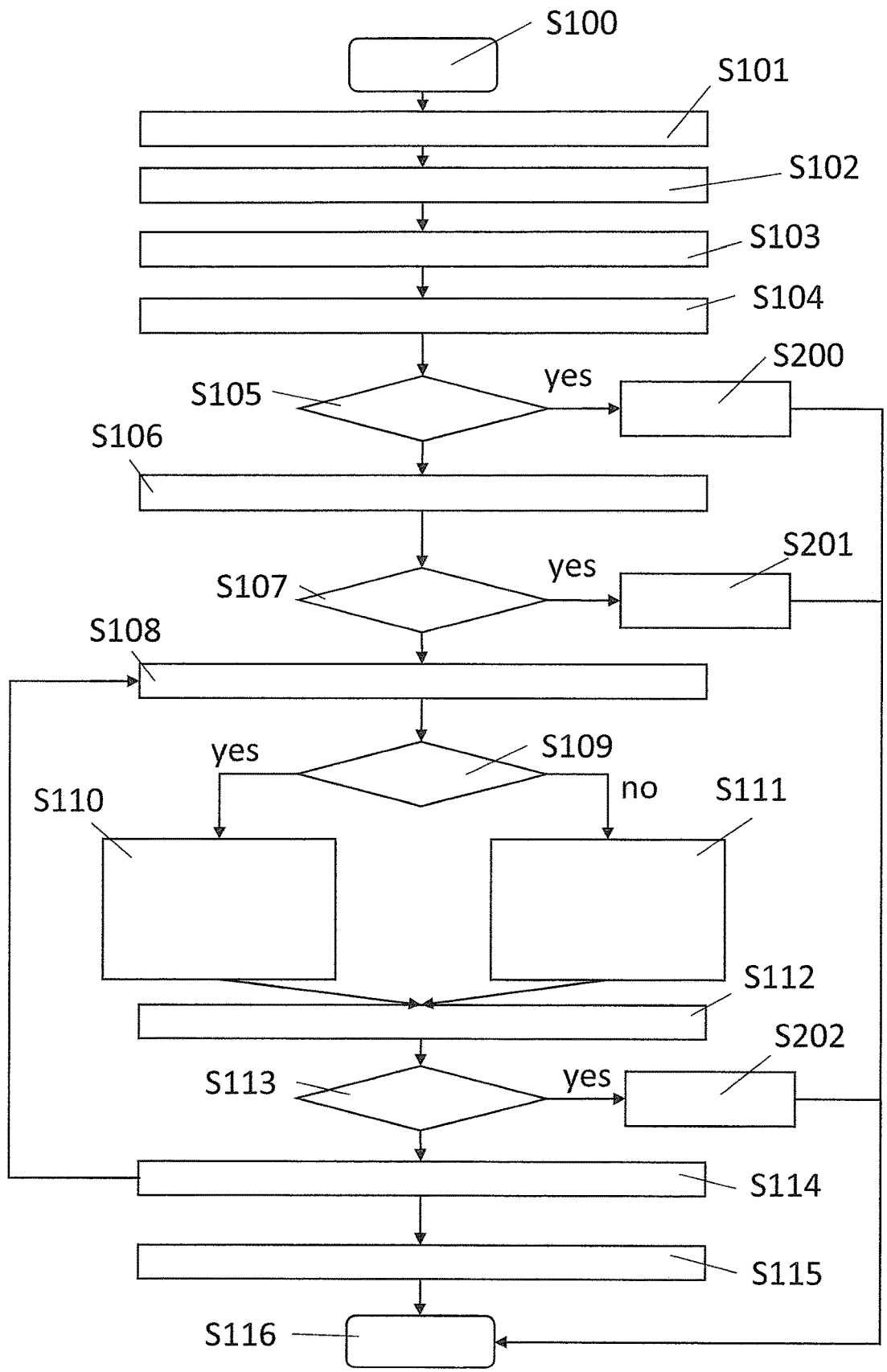
FIG. 4 shows a more detailed flow chart for a method for monitoring extra off-duty time intervals for a driver.

FIG. 4 shows a more detailed flow diagram of the method for monitoring the extra off-duty time intervals of the driver. In step S100, the method starts. In step S101, input data is obtained, containing all the on-duty and off-duty time intervals of the driver for a defined period, e.g., one day, one week and/or one month. The input data may be a container such as a list or a vector. Further, the driver day (a 24 hours period) is defined. In step S102 the beginning time and the end time of the input data to be processed is defined. In other words, it is defined over which time period the method should be executed. In step S103 the required off-duty time intervals are defined, further also the requirements for a workshift reset time interval and an extra off-duty time interval are defined in step S103. In step S104, the method scans the off-duty time intervals and subtracts all found extra off-duty time intervals from the required extra off-duty time, wherein the found extra off-duty time intervals have a duration longer as the second minimum length and less than the first minimum length. In step S105, the residual required extra off-duty time is compared to a predefined threshold, wherein the threshold is 0. If the residual extra off-duty time is 0 or less, the method continues with step S200, wherein the requirements are fulfilled and the method ends in step S116. If the residual extra off-duty time is greater than 0, the method continues with step S106. In step S106, the workshift reset time intervals are analyzed if they contain an off-duty time interval, which do not qualify as workshift reset time interval but as extra off-duty time interval, in particular, at the beginning or the end of the workshift reset time interval. The found extra off-duty time interval is subtracted from the residual required extra off-duty time interval. In step S107, the residual required extra off-duty time is compared to a predefined threshold, wherein the threshold is 0. If the residual extra off-duty time is 0 or less, the method continues with step S201, wherein the requirements are fulfilled and the method ends in step S116. If the residual extra off-duty time is greater as 0, the method continues with step S108. In step S108, the method scans the off-duty time interval in which the workshift reset time interval is located. In step S109 it is determined if the actual off-duty time interval start before the begin time of the method or not, if yes, the method continues in step S110, if not, the method continues in step S111. In step S110, the workshift reset time interval is put at the beginning of the off-duty time interval and the residual time is used as extra off-duty time interval. In step S111, the workshift reset time is shifted to the end of the off-duty time interval to create extra off-duty time at the beginning of the off-duty time interval. In step S112, the found or created extra off-duty time interval is subtracted from the residual required extra off-duty time interval. In step S113, the residual required extra off-duty time is compared to a predefined threshold, wherein the threshold is 0. If the residual extra off-duty time is 0 or less, the method continues with step S202, wherein the requirements are fulfilled and the method ends in step S116. If the residual extra off-duty time is greater as 0, the method continues with step S114. In step S114, the method continues to analyze the next off-duty time interval, in which a workshift reset time interval is located and the steps S108 to S113 are repeated. After all the off-duty time intervals have been processed by the method, the method continues in step S115 and the residual required extra off-duty time interval is outputted. The method ends in step S116.

In the following, the steps of the method of FIG. 4 are summarized:

S100: START

S101: Input data: a container (e.g., list) of all rest periods that span over the required time frame (driver day—24 h period considering driver terminal offset).

S102: Input data: the beginTime and endTime of the required time frame.

S103: Input data: the required rest time (=remainingRequiredTime) besides the rest period that gives a workshift reset (=corePeriod) and the minimum rest period duration for a workshift reset (=minimumCoreDuration).

S104: Step 1: Scan all rest periods that are not marked as 'FullCore' and decrease their duration (only the part that fits in the required time frame!) from the remainingRequiredTime until remainingRequiredTime becomes zero or all periods considered in this step are processed.

S105: remainingRequiredTime is 0 ? yes: S200; no: S106

S106: Step 2: Scan all rest periods that are marked as 'FullCore' but only consider the part of each period that does not qualify for a workshift reset (=restNotPartOfActualCore; e.g.: OFFS duty statuses) and decrease the duration of restNotPartOfActualCore found (only the part that fits in the required time frame!) from the remainingRequiredTime until remainingRequiredTime becomes zero or all periods considered in this step are processed.

S107: remainingRequiredTime is 0 ? yes: S201; no: S108

S108: Step 3: Scan a rest period from the list that is marked as 'FullCore' and consider only the part of this period that qualifies for a workshift reset (=actualCorePeriod; the period that was not considered in Step 2). Note: Only process such a period if its duration>minimumCoreDuration; For each period scanned in this step do the following sub-steps:

S109: actualCorePeriod starts before the beginTime? Yes: S110; No: S111

S110: Sub-step 3.1.a: Mark first the actualCorePeriod period as 'CORE' (if 'CORE' period is not already marked) with a duration of minimumCoreDuration; then mark the remaining time (<=remainingRequiredTime and fitting in the required time frame) as 'USED'.

S111: Sub-step 3.1.b: Mark first the period that is part of the remainingRequiredTime as 'USED' period (ensuring that enough time remains to be marked as 'CORE'—i.e., minimumCoreDuration) and then mark the 'CORE' period (if 'CORE' period is not already marked).

S112: Sub-step 3.2: Decrease the period marked as 'USED' from the remaining RequiredTime.

S113: remainingRequiredTime is 0 ? yes: S202; no: S114

S114: Sub-step 3.3: Go back to Step 3 (S108) and process the next rest period that is marked as 'FullCore' Note: Step 3 is executed until all periods marked as 'FullCore' are processed or remainingRequiredTime==0.

S115: Output data: isRequiredRestTimeFound=false; updated value of remaining RequiredTime.

S116: END

S200: Output data: isRequiredRestTimeFound=true.

S201: Output data: isRequiredRestTimeFound=true.

S202: Output data: isRequiredRestTimeFound=true.

Figure 5:
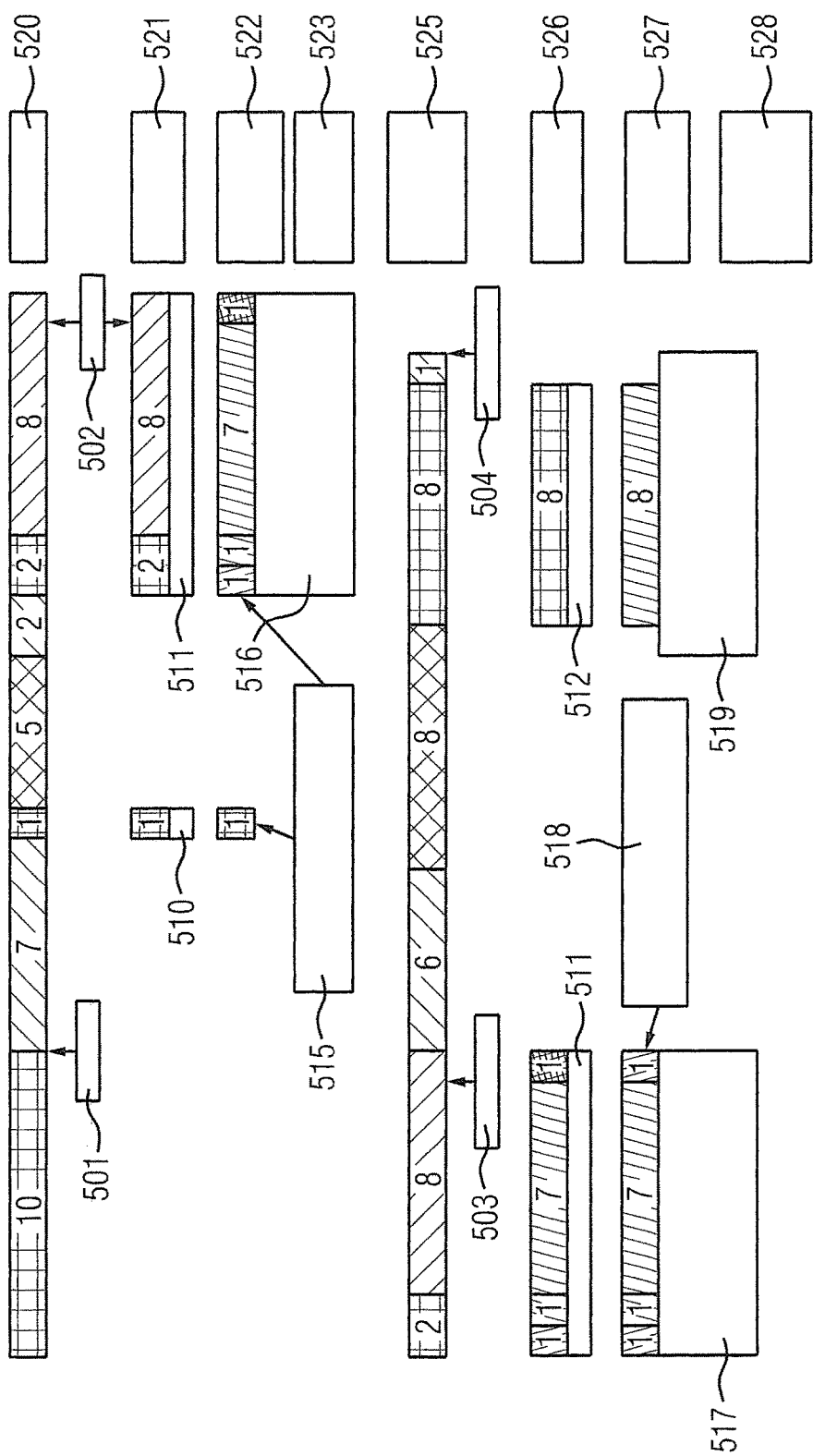
FIG. 5 shows an exemplary scheme of on-duty and off-duty time intervals of a driver and the analysis thereof.

FIG. 5 shows a schematic diagram of on-duty and off-duty time intervals of a driver during a typical driving period of the driver and how the method monitors that the extra off-duty time intervals are fulfilled. In the left upper corner different status types and different types of markings for on-duty and off-duty are exemplary defined. SB, OFF and OFFS are off-duty time intervals and ON and D are on-duty time intervals. Further, more status types and markings are possible:

Time regarded as off-duty:
off-duty (OFF), waiting at well site (OFFW), sleeper berth (SB), sleeping at well site (OFFS), time spent under personal use (PU);

Time regarded as on-duty:
on-duty not driving (ON), driving (D), time spent under yard moves (YM);

Time regarded as driving: driving (D).

Furthermore, in FIG. 5 a timeline is shown and the beginning and the end of the day. The first exemplary timeline start with 10 hours OFF, followed by 7 hours ON, 1 hour OFF, 5 hours D, 2 hours ON, 2 hours OFF and 8 hours SB. The 2 hours OFF and the 8 hours SB form an off-duty time interval of 10 hours in total. First, the method scans the off-duty time intervals and checks if an off-duty time interval is longer as the second minimum length and less than the first minimum length. In this case, the 1 hour OFF between the 7 hours ON and the 5 hours D. This found 1 hour OFF is subtracted from the required extra off-duty time interval, which is in this case 2 hours. Thus, 1 hour of extra off-duty time interval has to be found in the off-duty time intervals. Further, the method analyzes the off-duty time interval of 10 hours and defines the first hour as extra off-duty time interval followed by 8 hours of workshift reset time interval. Thus, the requirement of 2 hours of extra off-duty time interval can be met for this day. Further, the last hour of the 10 hours off-duty time interval is marked as "UNUSED" such that it can be used for the next day to be processed.

The second exemplary timeline consists of 2 hours OFF, 8 hours SB, 6 hours ON, 8 hours D, 8 hours OFF and 1 hour ON. As defined in the first exemplary timeline, the last hour of the 10 hours off-duty time interval is marked as UNUSED and can now be used as an extra off-duty time interval. Thus, another 1 hour extra off-duty time interval should be found in the timeline. However, the residual timeline is 6 hours ON followed by 8 hours D and then 8 hours OFF. The 8 hours OFF at the end of the day are used as workshift reset time interval. Therefore, the extra off-duty time interval of 2 hours cannot be met for this day, and a warning may be outputted to the driver.

The fields of FIG. 5 have the following functions:
501: Day n—Begin
502: Day n—End
503: Day n+1—Begin
504: Day n+1—End
510: R1 (Rest Period 1)
511: R2 (Rest Period 2)
512: R3 (rest Period 3)
515: Used as part of the daily rest required besides the 'actual core rest' for Day n (required time=2 h)
516: R2 after executing the algorithm for Day n: 1 h OFF duty marked as 'USED'; 1 h OFF duty marked as 'CORE'; 7 h SB marked as CORE'; 1 h SB marked as 'UNUSED' (default; free for further use).
517: R2 after executing the algorithm for Day n+1: 1 h OFF duty marked as 'USED' (used in Day n); 1 h OFF duty marked as 'CORE'; 7 h SB marked as 'CORE'; 1 h SB marked as 'USED' (used in Day n+1).
518: 1 h of SB Used as part of the daily rest required besides the 'actual core rest' for Day n+1 (required time=2 h).
519: R3 after executing the algorithm for day n+1: 8 h OFF duty marked as 'CORE'(there is no OFF duty remaining to be used as part of the daily rest required besides the 'actual core'.
520: Driver activity
521: Rest activities fed into the algorithm for day n.
522: Rest activities after executing the algorithm for day n.
523: The extra 2 h or rest required besides 'core' are found for day n.
525: Driver activity
526: Rest activities fed into the algorithm for day n+1.
527: Rest activities after executing the algorithm for day n+1.
528: The extra 2 h or rest required besides 'core' are NOT found for day n+1 (1 more hour is still required).

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for monitoring extra off-duty time intervals of a driver, comprising the following steps:
   obtaining (S1) on-duty time intervals and off-duty time intervals of a driver, wherein each off-duty time interval comprises a workshift reset time interval having a first minimum length and/or an extra off-duty time interval having a second minimum length, wherein the first minimum length is greater than the second minimum length;
   initializing (S2) a required extra off-duty time interval with a predefined value;
   scanning (S3) the off-duty time intervals to identify any extra off-duty time intervals that have a length more than the second minimum length and less than the first minimum length;
   subtracting (S4) any extra off-duty time intervals identified in the scanning step from the required extra off-duty time interval to obtain a first residual required extra off-duty time;
   if the first residual required extra off-duty time interval is greater than 0, analyzing (S5) the workshift reset time interval and determining if the workshift reset time interval comprises an extra off-duty time interval, which cannot be used as the workshift reset time interval;
   subtracting (S6) the analyzed extra off-duty time interval from the first residual required extra off-duty time interval to obtain a second residual required extra duty-off time;
   if the second residual required extra off-duty time interval is greater than 0, analyzing (S7) the workshift reset time interval and shifting, at least partly, the workshift reset time interval from today to tomorrow to create extra off-duty time interval today;
   subtracting (S8) the created extra off-duty time interval from the second required extra off-duty time interval to obtain a third residual required extra duty-off time interval;
   monitoring (S9), whether the third residual required extra off-duty time interval is greater than 0;
   summing the extra off-duty time intervals, comparing the sum to the third residual extra off-duty time interval and outputting a warning if the sum is not greater than the third required extra off-duty time interval; and
   outputting (S10) a warning if the third residual required extra off-duty time interval is greater than 0.

2. The method according to claim 1, wherein the first minimum length is 8 hours.

3. The method according to claim 1, wherein the second minimum length is 0.5 hours.

4. The method according to claim 1, wherein the required extra off-duty time interval is 2 hours.

5. A driver assistance system (1) for a vehicle (2), comprising:
   a tracking module (10) configured to track on-duty time intervals, during which the vehicle is operated, and off-duty time intervals, during which the vehicle is not operated or is operated for personal use;

a calculation module (20) configured to calculate a start time, which indicates to the driver how much off-duty time the driver still needs to spend and/or a stop time, which indicates to the driver how much on-duty time the driver has remaining, the calculation module (20) being further configured to:
    obtain on-duty time intervals and off-duty time intervals of a driver, wherein each off-duty time interval comprises a workshift reset time interval having a first minimum length and/or an extra off-duty time interval having a second minimum length, wherein the first minimum length is greater than the second minimum length,
    initialize a required extra off-duty time interval with a predefined value,
    scan the off-duty time intervals to identify any extra off-duty time intervals that have a length more than the second minimum length and less than the first minimum length,
    subtract any extra off-duty time intervals identified in the scanning step from the required extra off-duty time interval to obtain a first residual required extra off-duty time,
    if the first residual required extra off-duty time interval is greater than 0, analyze the workshift reset time interval and determine if the workshift reset time interval comprises an extra off-duty time interval, which cannot be used as the workshift reset time interval,
    subtract the analyzed extra off-duty time interval from the first residual required extra off-duty time interval to obtain a second residual required extra duty-off time,
    if the second residual required extra off-duty time interval is greater than 0, analyze the workshift reset time interval and shift, at least partly, the workshift reset time interval from today to tomorrow to create extra off-duty time interval today,
    subtract the created extra off-duty time interval from the second required extra off-duty time interval to obtain a third residual required extra duty-off time interval,
    monitor whether the third residual required extra off-duty time interval is greater than 0,
    sum the extra off-duty time intervals, compare the sum to the third residual extra off-duty time interval and output a warning if the sum is not greater than the third required extra off-duty time interval, and
    output a warning if the third residual required extra off-duty time interval is greater than 0,
wherein the calculated start time and/or stop time depends on duration and times of previously-tracked on-duty and off-duty time intervals; and
an output module (30), configured to output the start time and/or stop time to the driver.

6. The driver assistance system (1) according to claim 5, wherein the calculation module (20) is configured to calculate the start time and/or stop time based on road conditions of a driven route.

7. The driver assistance system (1) according to claim 5, wherein the calculation module (20) is configured to calculate the start time and/or stop time based on an actual fuel level of the vehicle.

8. The driver assistance system (1) according to claim 5, wherein the calculation module (20) is configured to calculate the start time and/or stop time based on the availability of parking spaces along the driven route.

9. The driver assistance system (1) according to claim 5, wherein the output module (30) is configured to warn the driver and/or an operator, if a duration of one of the off-duty time intervals is less than a predefined target time interval.

10. A non-transitory computer readable medium storing a computer program, that, when executed by a processor, is configured to carry out the method of claim 1.

* * * * *